United States Patent

Abe et al.

[11] Patent Number: 5,854,349
[45] Date of Patent: Dec. 29, 1998

[54] CYCLOOLEFIN COPOLYMER COMPOSITION

[75] Inventors: Yoshiharu Abe, Waki-cho; Toshihiro Sagane, Tokyo, both of Japan

[73] Assignees: Mitsui Petrochemical Industries, Ltd., Tokyo, Japan; Hoechst Aktiengesellschaft, Frankfurt am Main, Germany

[21] Appl. No.: 843,292

[22] Filed: Apr. 14, 1997

Related U.S. Application Data

[63] Continuation of Ser. No. 579,012, Dec. 27, 1995, abandoned.

[30] Foreign Application Priority Data

Dec. 28, 1994 [JP] Japan ..................... 6-328549

[51] Int. Cl.⁶ ............... C08L 23/16; C08L 23/08; C08L 53/02; C08L 45/00
[52] U.S. Cl. ............... 525/98; 525/289; 525/313
[58] Field of Search ............... 525/97, 98, 313, 525/289

[56] References Cited

U.S. PATENT DOCUMENTS

| | | | |
|---|---|---|---|
| 4,250,063 | 2/1981 | Kotani et al. | |
| 4,614,778 | 9/1986 | Kajiura et al. | 526/281 |
| 4,918,133 | 4/1990 | Moriya | 524/518 |
| 5,494,969 | 2/1996 | Abe | 525/289 |

FOREIGN PATENT DOCUMENTS

| | | |
|---|---|---|
| 0361909 | 4/1990 | European Pat. Off. . |
| 0597119 | 12/1993 | European Pat. Off. . |
| 0597119 | 5/1994 | European Pat. Off. . |
| 0608903 | 8/1994 | European Pat. Off. . |
| 2731263 | 1/1978 | Germany . |
| 60-168708 | 9/1985 | Japan . |
| 60-57363 | 12/1985 | Japan . |
| 3255145 | 3/1990 | Japan . |
| 03255145 | 11/1991 | Japan . |
| 0 641364 | 2/1994 | Japan . |
| 7-145213 | 6/1995 | Japan . |

*Primary Examiner*—Jeffrey C. Mullis
*Attorney, Agent, or Firm*—Sherman and Shalloway

[57] ABSTRACT

Disclosed is a cycloolefin copolymer composition (C) obtained by copolymerizing an α-olefin of two or more carbon atoms (a) and a specific cycloolefin (b) in the presence of an aromatic ring-containing vinyl hydrocarbon/conjugated diene copolymer or a product of hydrogenation thereof (A) which has an intrinsic viscosity (η) of 0.5 to 5.0 dl/g; at least one glass transition temperature (measured by DSC) of lower than 15° C.; polymerizable carbon-to-carbon double bonds in an amount of 2 to 150 in terms of iodine value; and a refractive index $n_D(A)$ of 1.50 to 1.65. In the composition (C), the component (A) is contained in an amount of 1 to 40% by weight, and a difference $\Delta n_D$ between the refractive index $n_D(A)$ of the component (A) and a refractive index $n_D(B)$ of a cycloolefin copolymer component (B) obtained by copolymerizing the α-olefin (a) and the cycloolefin (b) in the absence of the component (A) is not more than 0.015. The cycloolefin copolymer composition is excellent in impact resistance, transparency and heat resistance.

1 Claim, No Drawings

CYCLOOLEFIN COPOLYMER COMPOSITION

This application is a continuation of application Ser. No. 08/579,012, filed Dec. 27, 1995 now abandoned.

FIELD OF THE INVENTION

The present invention relates to a cycloolefin copolymer composition, and more particularly to a cycloolefin copolymer composition excellent in impact resistance, transparency and heat resistance.

BACKGROUND OF THE INVENTION

Cycloolefin random copolymers obtained by copolymerizing ethylene and cycloolefins such as tetracyclododecene are synthetic resins having high transparency and well-balanced among various properties such as heat resistance, heat aging resistance, resistance to chemicals, resistance to solvents, dielectric properties and rigidity. Such copolymers are known to exert excellent performance in the fields of optical materials such as optical memory discs and optical fibers, as described in for example Japanese Patent Laid-Open Publication No. 168708/1985.

Though the cycloolefin random copolymers are excellent particularly in heat resistance and rigidity, they are desired to be further improved in impact resistance.

In this connection, the present inventors have proposed, in Japanese Patent Laid-Open Publication No. 255145/1991, a resin composition comprising a soft polymer (rubber) and a cycloolefin random copolymer obtained by copolymerizing ethylene and a cycloolefin such as tetracylododecene.

This resin composition is superior to the cycloolefin random copolymers in the impact resistance, but the composition is desired to be further improved in the impact resistance.

The present inventors have also proposed, in Japanese Patent Laid-Open Publication No. 41364/1994, a cycloolefin copolymer obtained by copolymerizing an α-olefin and a cycloolefin in the presence of a hydrocarbon elastomer having a polymerizable double bond.

Though the cycloolefin copolymer is excellent in impact resistance, it is desired to be further improved in transparency.

Under these circumstances, the present inventors have earnestly studied to solve the above-mentioned problems associated with the prior art, and as a result, they have found a cycloolefin copolymer composition exhibiting particularly excellent transparency and impact resistance is obtained by copolymerizing an α-olefin of at least 2 carbon atoms such as ethylene and a cycloolefin in the presence of a specific aromatic ring-containing vinyl hydrocarbon/conjugated diene copolymer or a product of hydrogenation thereof (A). The cycloolefin copolymer composition contains a specific amount of the component (A) and has a specifically ranged difference $\Delta n_D$ between the refractive index $n_D(A)$ of the component (A) and a refractive index $n_D(B)$ of a cycloolefin copolymer component (B) obtained by copolymerizing the α-olefin and the cycloolefin in the absence of the component (A). Based on this finding, the present invention has been accomplished.

OBJECT OF THE INVENTION

The present invention is intended to solve such problems associated with the prior art as described above, and it is an object of the present invention to provide a cycloolefin copolymer composition exhibiting particularly improved impact resistance and transparency while maintaining excellent properties inherent in a cycloolefin random copolymer.

SUMMARY OF THE INVENTION

The cycloolefin copolymer composition (C) of the present invention is obtained by copolymerizing:

(a) an α-olefin of at least 2 carbon atoms, and (b) a cycloolefin represented by the following formula (I) or (II), in the presence of (A) an aromatic ring-containing vinyl hydrocarbon/conjugated diene copolymer or a product of hydrogenation thereof, the component (A) having an intrinsic viscosity (η), as measured in decalin at 135° C., of 0.5 to 5.0 dl/g; at least one glass transition temperature (Tg), as measured by DSC, of lower than 15° C.; polymerizable carbon-to-carbon double bonds in an amount of 2 to 150 (g-iodine/100 g-polymer) in terms of iodine value; and a refractive index $n_D(A)$, as measured at 25° C., of 1.50 to 1.65;

wherein the copolymer composition (C) contains 1 to 40% by weight of the component (A), and a difference $\Delta n_D$ is not more than 0.015, where $\Delta n_D$ is $|n_D(A)-n_D(B)|$, $n_D(A)$ is the refractive index of the component (A) and $n_D(B)$ is a refractive index of a cycloolefin copolymer component (B) obtained by copolymerizing the α-olefin (a) and the cycloolefin (b) in the absence of the component (A):

Formula (I)

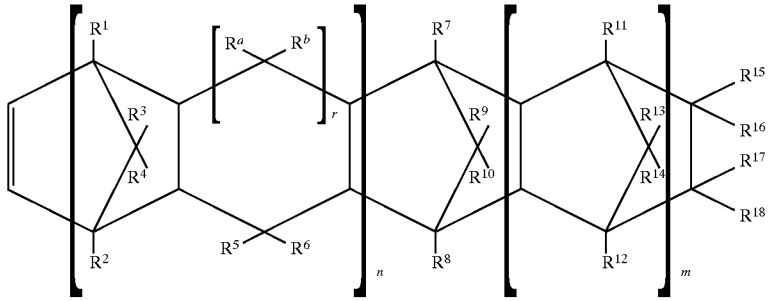

wherein n is 0 or 1, m is 0 or a positive integer, r is 0 or 1 and each of $R^1$ to $R^{18}$, $R^a$ and $R^b$ independently represents a hydrogen atom, a halogen atom or a hydrocarbon group, provided that $R^{15}$ to $R^{18}$ may mutually bond to form a monocyclic or polycyclic ring structure which may contain a double bond, and that a combination of $R^{15}$ and $R^{16}$ or a combination of $R^{17}$ and $R^{18}$ may form an alkylidene group; or Formula (II)

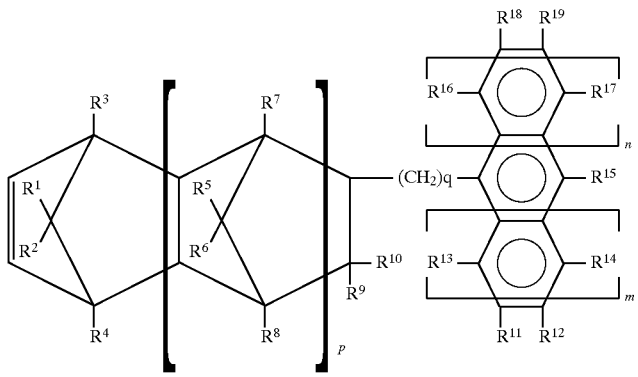

wherein each of p and q is 0 or an integer of 1 or greater, each of m and n is 0, 1 or 2 and each of $R^1$ to $R^{19}$ independently represents a hydrogen atom, a halogen atom, an aliphatic hydrocarbon group, an alicyclic hydrocarbon group, an aromatic hydrocarbon group or an alkoxy group, provided that a carbon atom with which $R^9$ (or $R^{10}$) bonds and either a carbon atom with which $R^{13}$ bonds or a carbon atom with which $R^{11}$ bonds may bond with each other directly or through an alkylene group having 1 to 3 carbon atoms and that, when n=m=0, a combination of $R^{15}$ and $R^{12}$ or a combination of $R^{15}$ and $R^{19}$ may mutually bond to form an aromatic monocyclic ring or aromatic polycyclic rings.

In a preferred embodiment of the present invention, the amount of the carbon-to-carbon double bonds contained in the aromatic ring-containing vinyl hydrocarbon/conjugated diene copolymer or the product of hydrogenation thereof is in the range of 2 to 50 (g-iodine/100 g-polymer) in terms of iodine value.

The cycloolefin copolymer composition of the present invention exhibits particularly improved impact resistance and transparency while maintaining excellent properties inherent in a cycloolefin random copolymer.

DETAILED DESCRIPTION OF THE INVENTION

The cycloolefin copolymer composition (C) of the present invention will be described in detail hereinafter.

First, the aromatic ring-containing vinyl hydrocarbon/conjugated diene copolymer or the product of hydrogenation thereof (A) containing polymerizable carbon-to-carbon double bonds is described in detail.

(A) Aromatic ring-containing vinyl hydrocarbon-conjugated diene copolymer or product of hydrogenation thereof The aromatic ring-containing vinyl hydrocarbon/conjugated diene copolymer or the product of hydrogenation thereof (thermoplastic elastomer) (A) used in the present invention has the following properties.

The intrinsic viscosity (η), as measured in decalin at 135° C., is in the range of 0.5 to 5.0 dl/g, preferably 1.0 to 4.5 dl/g.

At least one glass transition temperature (Tg), as measured by DSC, is lower than 15° C., preferably lower than 0° C.

This component (A) has carbon-to-carbon double bonds, and the amount of the double bonds is in the range of 2 to 150 (g-iodine/100 g-polymer), preferably 2 to 50 (g-iodine/100 g-polymer) in terms of iodine value. When the iodine value exceeds 150, flowability in the polymerization reaction system is likely to be poor.

The refractive index $n_D(A)$, as measured at 25° C., is in the range of 1.50 to 1.65, preferably 1.51 to 1.55.

The melt flow rate of the component (A), as measured at 230° C. under a load of 2.16 kg in accordance with ASTM D1238, is in the range of usually 0.01 to 200 g/10 min, preferably 0.1 to 100 g/10 min, more preferably 0.5 to 50 g/10 min.

Examples of the aromatic ring-containing vinyl hydrocarbon/conjugated diene copolymer or the product of hydrogenation thereof (A) include styrene/conjugated diene block copolymers, such as SBS [polystyrene (PS)/polybutadiene/PS], SBR (styrene/butadiene block copolymer), styrene/isoprene block copolymer and SIS (PS/polyisoprene/PS); and hydrogenated products of SBS and SIS, such as styrene/(ethylene/butylene)/styrene block copolymer (SEBS) and styrene/(ethylene/propylene)/styrene block copolymer (SEPS).

Specific examples of the styrene/conjugated diene block copolymers include Kraton (available form Shell Kagaku K. K.), Cariflex TR (available from Shell Kagaku K. K.), Solprene (available from Phillips Petroleum Co.), Europrene SOLT (available from ANIC, S.p.A.), Tufprene (available from Asahi Chemical Industry Co., Ltd.), Solprene-T (available from Nippon Elastomer K. K.), JSRTR (available from Japan Synthetic Rubber Co., Ltd.), Denka STR (available from Denki Kagaku Kogyo K.K.), Quintac (Nippon Zeon Co., Ltd.), Kraton G (available from Shell Kagaku K. K.) and Tuftec (available from Asahi Chemical Industry Co., Ltd.).

Specific examples of the hydrogenation products of the styrene/conjugated diene block copolymers include Kraton G1650, G1652, G1657, G1701 (available from Shell Kagaku K. K.) and Tuftec (available from Asahi Chemical Industry Co., Ltd.), all being SEBS.

The SEBS [styrene/(ethylene/butylene)/styrene block copolymer] is a thermoplastic elastomer composed of polystyrene block units and polyethylene/polybutylene rubber block units.

In this styrene/(ethylene/butylene)/styrene block copolymer, polystyrene block units as hard segments are present as crosslinking points for the rubber block units and they form a physical crosslinked structure (domain), while the rubber block units which are present among the polystyrene block units are soft segments and have elastomeric properties.

The SEBS can be obtained by a conventionally known method, for example, a method described in Japanese Patent Publication No. 57363/1985.

In the present invention, the aromatic ring-containing vinyl hydrocarbon/conjugated diene copolymers or the products of hydrogenation thereof may be used in combination of two or more kinds.

Of the above-mentioned styrene/conjugated diene copolymers and the products of hydrogenation thereof, SEBS, SEPS, SBR and SBS are preferably used.

Next, the cycloolefin copolymer composition (C) of the invention is described in detail.

(C) Cycloolefin copolymer composition

The cycloolefin copolymer composition (C) comprises a cycloolefin copolymer component obtained by copolymerizing an α-olefin of at least 2 carbon atoms (a) and a cycloolefin (b) represented by the following formula (I) or (II) in the presence of the aromatic ring-containing vinyl hydrocarbon/conjugated diene copolymer or the product of hydrogenation thereof (A) containing polymerizable carbon-to-carbon double bonds.

The α-olefin of at least 2 carbon atoms (a) may be a straight chain or a branched chain. The α-olefin of at least 2 carbon atoms is generally an α-olefin of 2 to 20 carbon atoms, and examples thereof include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Of these, preferred are ethylene and propylene, and particularly preferred is ethylene. These α-olefins may be used singly or in combination of two or more kinds.

The cycloolefin (b) is represented by the following formula (I) or (II).
Formula (I)

The halogen atom is selected from among fluorine, chlorine, bromine and iodine atoms.

The hydrocarbon group is generally selected from among alkyl groups each having 1 to 20 carbon atoms and cycloalkyl groups each having 3 to 15 carbon atoms. Examples of the above alkyl groups include methyl, ethyl, propyl, isopropyl, amyl, hexyl, octyl, decyl, dodecyl and octadecyl groups. An example of the above cycloalkyl group is cyclohexyl. These groups may be those substituted with halogen atoms.

In the formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may mutually bond (cooperate) to form a monocyclic or polycyclic rings. The thus formed monocyclic or polycyclic rings may have a double bond.

Examples of the above monocyclic ring or polycyclic rings include the following groups:

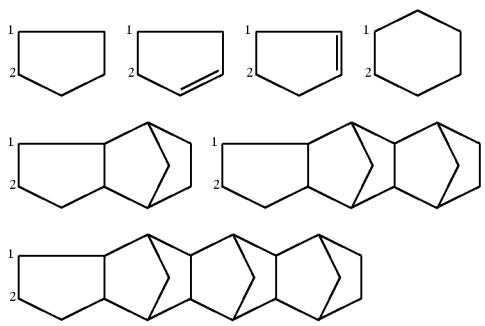

In the above examples of groups, the carbon atoms having numerals 1 and 2 affixed thereto respectively corresponds to

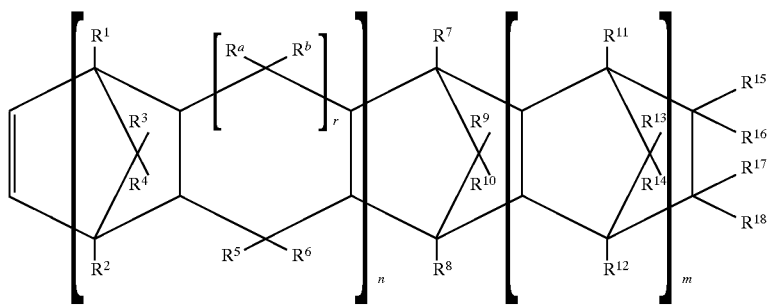

In the formula (I), n is 0 or 1, m is 0 or a positive integer, and r is 0 or 1. When r is 1, the ring represented with the use of r is a 6-membered ring. On the other hand, when r is 0, it is a 5-membered ring.

Each of $R^1$ to $R^{18}$, $R^a$ and $R^b$ independently represents a hydrogen atom, a halogen atom or a hydrocarbon group.

those with which $R^{15}$ ($R^{16}$) or $R^{17}$ ($R^{18}$) bond in the formula (I).

$R^{15}$ and $R^{16}$, or $R^{17}$ and $R^{18}$ may cooperate to thereby form an alkylidene group. The alkylidene group has 2 to 20 carbon atoms. Examples of the above alkylidene groups include ethylidene, propylidene and isopropylidene groups.

Formula (II)

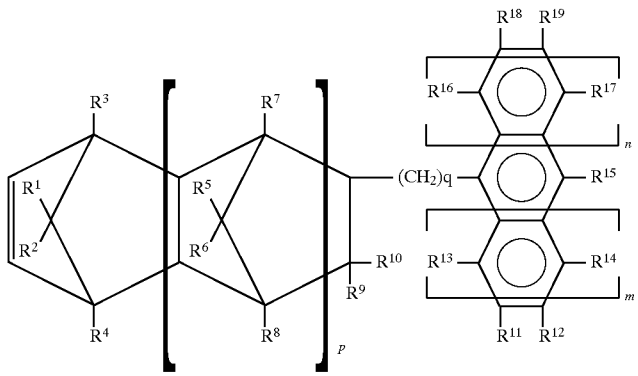

In the formula (II), each of p and q is 0 or a positive integer, and each of m and n is 0, 1 or 2.

Each of $R^1$ to $R^{19}$ independently represents a hydrogen atom, a halogen atom, an aliphatic hydrocarbon group, an alicyclic hydrocarbon group, an aromatic hydrocarbon group or an alkoxy group.

The halogen atom is selected from among those mentioned above with respect to the formula (I).

The aliphatic hydrocarbon group is selected from among alkyl groups each having 1 to 20 carbon atoms, and examples thereof include methyl, ethyl, propyl, isopropyl, amyl, hexyl, octyl, decyl, dodecyl and octadecyl groups.

The alicyclic hydrocarbon group is selected from among cycloalkyl groups each having 3 to 15 carbon atoms, and an example thereof is cyclohexyl.

The aromatic hydrocarbon is selected from among aryl and aralkyl groups, and examples thereof include phenyl, tolyl, naphthyl, benzyl and phenylethyl groups. These groups may have a lower alkyl group.

Examples of the above alkoxy groups include methoxy, ethoxy and propoxy groups.

The above-mentioned groups may be substituted with halogen atoms.

In the above formula (II), the carbon atom with which $R^9$ and $R^{10}$ bond and the carbon atom with which $R^{13}$ bonds or the carbon atom with which $R^{11}$ bonds may bond with each other directly or through an alkylene group having 1 to 3 carbon atoms. When two carbon atoms bond with each other through an alkylene group, either $R^9$ cooperates with $R^{13}$ or $R^{10}$ with $R^{11}$ to thereby form an alkylene group selected from among methylene ($-CH_2-$), ethylene ($-CH_2CH_2-$) and propylene ($-CH_2CH_2CH_2-$).

When n=m=0, $R^{15}$ may bond with $R^{12}$ or $R^{15}$ with $R^{19}$ to thereby form an aromatic monocyclic ring or aromatic polycyclic rings. Examples of the aromatic rings formed by $R^{15}$ and $R^{12}$ when n=m=0 are as follows:

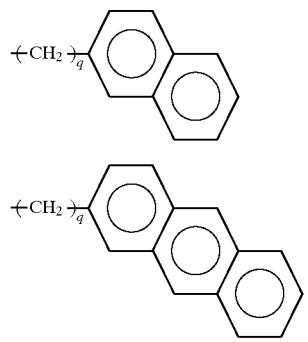

-continued

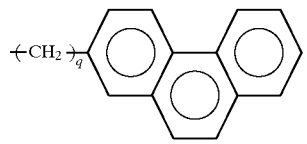

In the above formulae, q has the same meaning as in the formula (II).

Examples of the cycloolefins represented by the formula (I) and (II) include:

bicyclo[2.2.1]-2-heptene (=norbornene) represented by the formula:

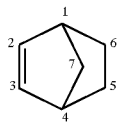

(wherein the numerals 1 to 7 are position numbers of carbons), and derivatives thereof substituted with hydrocarbon groups.

Examples of the hydrocarbon groups include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenyl), 5-(β-naphthyl), 5-(α-naphthyl), 5-(anthracenyl) and 5,6-diphenyl.

Examples of other derivatives include:

bicyclo[2.2.1]-2-heptene derivatives, such as cyclopentadiene-acenaphthylene adducts, 1,4-methano-1,4,4a,9a-tetrahydrofluorene and 1,4-methano-1,4,4a,5,10,10a-hexahydroanthracene;

tricyclo[4.3.0.1$^{2,5}$]-3-decene derivatives, such as tricyclo[4.3.0.1$^{2,5}$]-3-decene, 2-methyltricyclo[4.3.0.1$^{2,5}$]-3-decene and 5-methyltricyclo[4.3.0.1$^{2,5}$]-3-decene;

tricyclo[4.4.0.1$^{2,5}$]-3-undecene derivatives, such as tricyclo[4.4.0.1$^{2,5}$]-3-undecene and 10-methyltricyclo[4.4.0.1$^{2,5}$]-3-undecene; and tetracyclo[4.4.0.1$^{2,5}$.1$^{7,10}$]-3-dodecene represented by the formula:

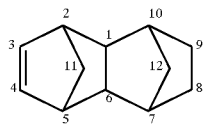

and derivatives thereof substituted with hydrocarbon groups.

Examples of the hydrocarbon groups include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethylphenyl), 8-(isopropylphenyl), 8,9-diphenyl, 8-(biphenyl), 8-(β-naphthyl), 8-(α-naphthyl), 8-(anthracenyl) and 5,6-diphenyl.

Also employable are:

tatracyclo[$4.4.0.1^{2,5}.1^{7,10}$]-3-dodecene derivatives such as an addition product of cyclopentadiene/acenaphthylene adduct with cyclopentadiene;

pentacyclo[$6.5.1.1^{3,6}.0^{2,7}.0^{9,13}$]-4-pentadecene and derivatives thereof;

pentacyclo[$7.4.0.1^{2,5}.1^{9,12}.0^{8,13}$]-3-pentadecene and derivatives thereof;

pentacyclo[$8.4.0.1^{2,5}.1^{9,12}.0^{8,13}$]-3-hexadecene and derivatives thereof;

pentacyclo[$6.6.1.1^{3,6}.0^{2,7}.0^{9,14}$]-4-hexadecene and derivatives thereof;

hexacyclo[$6.6.1.1^{3,6}.1^{10,13}.0^{2,7}.0^{9,14}$]-4-heptadecene and derivatives thereof;

heptacyclo[$8.7.0.1^{2,9}.1^{4,7}.1^{11,17}.0^{3,8}.0^{12,16}$]-5-eicosene and derivatives thereof;

heptacyclo[$8.7.0.1^{3,6}.1^{10,17}.1^{12,15}.0^{2,7}.0^{11,16}$]-4-eicosene and derivatives thereof;

heptacyclo[$8.8.0.1^{2,9}.1^{4,7}.1^{11,18}.0^{3,8}.0^{12,17}$]-5-heneicosene and derivatives thereof;

octacyclo[$8.8.0.1^{2,9}.1^{4,7}.1^{11,18}.1^{13,16}.0^{3,8}.0^{12,17}$]-5-docosene and derivatives thereof; and nonacyclo[$10.9.1.1^{4,7}.1^{13,20}.1^{15,18}.0^{2,10}.0^{3,8}.0^{12,21}.0^{14,19}$]-5-pentacosene and derivatives thereof.

Although examples of the cycloolefins represented by the above formula (I) or (II) employable in the present invention are described above, more specific structures of these compounds are shown in Japanese Patent Laid-Open Publication No. 145213/1995, paragraphs 0032–0054 (corresponding to Japanese Patent Application No. 196475/1993) by the applicant of the present application, and the compounds exemplified in this publication are also employable as the cycloolefins in the present invention.

The cycloolefins represented by the formula (I) or (II) can be prepared by subjecting cyclopentadienes and olefins of the corresponding structures to Diels-Alder reaction.

These cycloolefins may be used singly or in combination of two or more kinds.

The above cycloolefin copolymers (α-olefin/cycloolefin copolymers) are exemplified below.

Examples of the α-olefin/cycloolefin copolymers include:

ethylene/norbornene copolymer, ethylene/5-methyl-2-norbornene copolymer, ethylene/5-ethyl-2-norbornene copolymer, ethylene/5-propyl-2-norbornene copolymer, ethylene/5-butyl-2-norbornene copolymer, ethylene/5-pentyl-2-norbornene copolymer, ethylene/5-hexyl-2-norbornene copolymer, ethylene/5-heptyl-2-norbornene copolymer, ethylene/5-octyl-2-norbornene copolymer, ethylene/5-nonyl-2-norbornene copolymer, ethylene/5-decyl-2-norbornene copolymer, ethylene/5-undecyl-2-norbornene copolymer, ethylene/5-dodecyl-2-norbornene copolymer, ethylene/5-phenyl-2-norbornene copolymer, ethylene/1,4-methano-1,4,4a,9a-tetrahydrofluorene copolymer, ethylene/tetracyclododecene copolymer, ethylene/propyethylene/norbornene copolymer, ethylene/propylene/5-ethylidene-2-norbornene copolymer, ethylene/propylene/5-methyl-2-norbornene copolymer, ethylene/propylene/5-ethyl-2-norbornene copolymer, ethylene/propylene/5-propyl-2-norbornene copolymer, ethylene/propylene/5-butyl-2-norbornene copolymer, ethylene/propylene/5-pentyl-2-norbornene copolymer, ethylene/propylene/5-hexyl-2-norbornene copolymer, ethylene/propylene/5-heptyl-2-norbornene copolymer, ethylene/propylene/5-octyl-2-norbornene copolymer, ethylene/propylene/5-nonyl-2-norbornene copolymer, ethylene/propylene/5-decyl-2-norbornene copolymer, ethylene/propylene/5-undecyl-2-norbornene copolymer, ethylene/propylene/5-dodecyl-2-norbornene copolymer, ethylene/propylene/5-phenyl-2-norbornene copolymer, ethylene/propylene/tetracyclododecene copolymer, ethylene/1-butene/norbornene copolymer, ethylene/1-butene/5-ethylidene-2-norbornene copolymer, ethylene/1-butene/5-methyl-2-norbornene copolymer, ethylene/1-butene/5-ethyl-2-norbornene copolymer, ethylene/1-butene/5-propyl-2-norbornene copolymer, ethylene/1-butene/5-butyl-2-norbornene copolymer, ethylene/1-butene/5-pentyl-2-norbornene copolymer, ethylene/1-butene/5-hexyl-2-norbornene copolymer, ethylene/1-butene/5-heptyl-2-norbornene copolymer, ethylene/1-butene/5-octyl-2-norbornene copolymer, ethylene/1-butene/5-nonyl-2-norbornene copolymer, ethylene/1-butene/5-decyl-2-norbornene copolymer, ethylene/1-butene/5-undecyl-2-norbornene copolymer, ethylene/1-butene/5-dodecyl-2-norbornene copolymer, ethylene/1-butene/5-phenyl-2-norbornene copolymer, ethylene/1-butene/tetracyclododecene copolymer, ethylene/1-hexene/norbornene copolymer, ethylene/1-hexene/5-methyl-2-norbornene copolymer, ethylene/1-hexene/5-ethyl-2-norbornene copolymer, ethylene/1-hexene/5-propyl-2-norbornene copolymer, ethylene/1-hexene/5-butyl-2-norbornene copolymer, ethylene/1-hexene/5-pentyl-2-norbornene copolymer, ethylene/1-hexene/5-hexyl-2-norbornene copolymer, ethylene/1-hexene/5-heptyl-2-norbornene copolymer, ethylene/1-hexene/5-octyl-2-norbornene copolymer, ethylene/1-hexene/5-nonyl-2-norbornene copolymer, ethylene/1-hexene/5-decyl-2-norbornene copolymer, ethylene/1-hexene/5-undecyl-2-norbornene copolymer, ethylene/1-hexene/5-dodecyl-2-norbornene copolymer, ethylene/1-hexene/5-phenyl-2-norbornene copolymer, ethylene/1-hexene/tetracyclododecene copolymer, ethylene/1-octene/norbornene copolymer, ethylene/1-octene/5-methyl-2-norbornene copolymer, ethylene/1-octene/5-ethyl-2-norbornene copolymer, ethylene/1-octene/5-propyl-2-norbornene copolymer, ethylene/1- octene/5-butyl-2-norbornene copolymer, ethylene/1-octene/5-pentyl-2-norbornene copolymer, ethylene/1-octene/5-hexyl-2-norbornene copolymer, ethylene/1-octene/5-heptyl-2-norbornene copolymer, ethylene/1-octene/5-octyl-2-norbornene copolymer, ethylene/1-octene/5-nonyl-2-norbornene copolymer, ethylene/1-octene/5-decyl-2-norbornene copolymer, ethylene/1-octene/5-undecyl-2-norbornene copolymer, ethylene/1-octene/5-dodecyl-2-norbornene copolymer, ethylene/1-octene/5-phenyl-2-norbornene copolymer, ethylene/1-octene/tetracyclododecene copolymer, ethylene/1-decene/norbornene copolymer, ethylene/1-decene/5-methyl-2-norbornene copolymer, ethylene/1-decene/5-ethyl-2-norbornene copolymer, ethylene/1-decene/5-propyl-2-norbornene copolymer, ethylene/1-decene/5-butyl-2-norbornene copolymer, ethylene/1-decene/5-pentyl-2-norbornene copolymer, ethylene/1-decene/5-hexyl-2-norbornene copolymer, ethylene/1-decene/5-heptyl-2-norbornene copolymer, ethylene/1-decene/5-octyl-2-norbornene copolymer, ethylene/1-decene/5-nonyl-2-norbornene copolymer, ethylene/1-decene/5-decyl-2-norbornene copolymer, ethylene/1-decene/5-undecyl-2-norbornene copolymer, ethylene/1-decene/5-dodecyl-2-norbornene copolymer, ethylene/1-decene/5-phenyl-2-norbornene copolymer and ethylene/1-decene/tetracyclododecene copolymer.

The cycloolefin copolymer composition (C) of the present invention comprises a cycloolefin copolymer component obtained by copolymerizing the α-olefin of at least 2 carbon atoms (a) and the cycloolefin (b) represented by the above formula (I) or (II) in the presence of the aforementioned aromatic ring-containing vinyl hydrocarbon/conjugated diene copolymer or the product of hydrogenation thereof (A) having substantially polymerizable double bonds.

In order to obtain the cycloolefin copolymer composition (C), other cycloolefins than the cycloolefin of the formula (I) or (II) may be copolymerized in amounts not detrimental to the properties of the copolymer component, in addition to the α-olefin (a) and the cycloolefin (b).

The term "other cycloolefins" used herein has a wide meaning including unsaturated polycyclic hydrocarbon compounds except the cycloolefin of the formula (I) or (II).

Examples of the other cycloolefins include cyclobutene, cyclohexene, cyclopentene, 3,4-dimethylcyclopentene, 3-methylcyclohexene, 2-(2-methylbutyl)-1-cyclohexene, styrene, α-methylstyrene and 3a,5,6,7a-tetrahydro-4,7-methano-1H-indene.

The cycloolefin copolymer composition (C) of the present invention contains 1 to 40% by weight, preferably 2 to 30% by weight, of the component (A).

As for the cycloolefin copolymer composition (C) of the present invention, the difference $\Delta n_D$ is not more than 0.015, where $\Delta n_D$ is $|n_D(A)-n_D(B)|$, $n_D(A)$ is a refractive index of the component (A) and $n_D(B)$ is a refractive index of the cycloolefin copolymer component (B) as described hereinbelow.

The cycloolefin copolymer component (B) is a cycloolefin copolymer obtained by copolymerizing the α-olefin of at least 2 carbon atoms (a) and the cycloolefin (b) represented by the formula (I) or (II) in the absence of the component (A).

In the present invention, the refractive index of the component (A) and the refractive index of the component (B) are measured by the use of an Abbe's refractometer (D-line, 589 nm).

In the cycloolefin copolymer composition (C) of the present invention, it is presumed that the cycloolefin copolymer component formed from the α-olefin (a) and the cycloolefin (b) is at least partially chemically bonded to the component (A). This can be confirmed also from the fact that the cycloolefin copolymer composition (C) of the present invention is superior in the transparency and the impact resistance to a cycloolefin copolymer composition of a mere blend of the component (A) with the cycloolefin random copolymer component (B) obtained by copolymerizing the α-olefin (a) and the cycloolefin (b) in the absence of the component (A) containing polymerizable double bonds.

As for the cycloolefin copolymer composition (C) of the present invention, the difference $\Delta n_D$, where $\Delta n_D$ is $|n_D(A)-n_D(B)|$, $n_D(A)$ is a refractive index of the component (A) and $n_D(B)$ is a refractive index of the cycloolefin copolymer component (B) obtained by copolymerizing the α-olefin (a) and the cycloolefin (b) in the absence of the component (A), is not more than 0.015, as described above, and the difference is preferably not more than 0.010, more preferably not more than 0.005.

In the cycloolefin copolymer composition (C), a part of the cycloolefin copolymer component is chemically bonded to the component (A), so that only the cycloolefin copolymer component is unable to be taken out from the composition (C). For this reason, the refractive index $n_D(B)$ of the cycloolefin random copolymer component (B) obtained by copolymerizing the α-olefin of at least 2 carbon atoms (a) and the cycloolefin (b) in the absence of the component (A) is adopted in this specification.

In the preparation of the component (A) (aromatic ring-containing vinyl hydrocarbon/conjugated diene copolymer or the product of hydrogenation thereof), or in the preparation of the cycloolefin copolymer composition (C) by copolymerizing the α-olefin (a) and the cycloolefin (b) in the presence of the component (A), a transition metal catalyst is employed.

Employable as the transition metal catalyst is:

(i) a catalyst formed from a soluble vanadium compound and an organoaluminum compound, or (ii) a catalyst formed from a metallocene compound of a transition metal selected from the periodic table Group IVB metals and lanthanoid and an organoaluminum oxy-compound, and optionally, an organoaluminum compound.

The soluble vanadium compound for forming the catalyst (i) is represented specifically by the formula $VO(OR)_aX_b$ or $V(OR)_cX_d$ (wherein R is a hydrocarbon group, and a, b, c and d are numbers satisfying the conditions of $0 \leq a \leq 3$, $0 \leq b \leq 3$, $2 \leq a+b \leq 3$, $0 \leq c \leq 4$, $0 \leq d \leq 4$, and $3 \leq c+d \leq 4$).

The organoaluminum compound used for forming the catalyst (i) together with the soluble vanadium compound has at least one Al—C bond in its molecule and is, for example, a compound represented by the following formula:

$R^1_m Al(OR^2)_n H_p X_q$.

wherein each of $R^1$ and $R^2$ represents a hydrocarbon group having usually 1 to 15 carbon atoms, preferably 1 to 4 carbon atoms, which may be the same as or different, X represents a halogen atom, and m, n, p, q are numbers represented by $0 \leq m \leq 3$, $0 \leq n < 3$, $0 \leq p < 3$, $0 \leq q < 3$ and m+n+p+q=3, or a complex alkylated product which is formed from a metal of the periodic table Group I and aluminum represented by the following formula:

$M^1 AlR^1_4$ wherein M¹ represents Li, Na, K, and R¹ is as defined above.

The catalyst (ii) formed from a metallocene compound of a transition metal selected from the periodic table Group IVB metals and lanthanoid, an organoaluminum oxy-compound, and optionally, an organoaluminum compound is described below.

The metallocene compound of a transition metal selected from the periodic table Group IVB metals and lanthanoid is, for example, a compound represented by the following formula:

$$ML_x$$

wherein M represents a transition metal selected from the periodic table Group IVB metals and lanthanoid, specifically, zirconium, titanium, hafnium, neodymium, samarium or ytterbium, L is a ligand coordinated to the transition metal, at least one ligand L is a ligand having a cyclopentadienyl skeleton, the ligand L other than the ligand having a cyclopentadienyl skeleton is a hydrocarbon group having 1 to 12 carbon atoms, an alkoxy group, an aryloxy group, a halogen atom, a trialkylsilyl group, $SO_3R$ (R is a hydrocarbon group having 1 to 8 carbon atoms which may have a substituent such as a halogen atom) or a hydrogen atom, and x is a valence of the transition metal.

The organoaluminum oxy-compound used for forming the catalyst (ii) in the present invention is described below.

The organoaluminum oxy-compound used in the present invention may be a conventionally known aluminoxane, or it may be a benzene-insoluble organoaluminum oxy-compound.

The conventionally known aluminoxane is represented by the following formula:

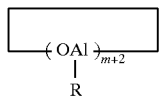

wherein R represents a hydrocarbon group such as a methyl, ethyl, propyl or butyl group, preferably a methyl or ethyl group, more preferably a methyl group, and m is an integer of not less than 2, preferably an integer of 5 to 40.

The benzene-insoluble organoaluminum oxy-compound used in the present invention can be obtained by, for example, a procedure of bringing a solution of aluminoxane to contact with water or an active hydrogen-containing compound, or a procedure of bringing the organoaluminum compound as mentioned above with water.

The organoaluminum compound which is used according to necessity is, for example, an organoaluminum compound represented by the following formula:

$$R^5_n AlX_{3-n}$$

wherein $R^5$ represents a hydrocarbon group having 1 to 12 carbon atoms, X represents a halogen atom or a hydrogen atom, and n is 1 to 3.

In the above formula, the hydrocarbon group having 1 to 12 carbon atoms for $R^5$ is an alkyl group, a cycloalkyl group or an aryl group, and examples thereof include a methyl, ethyl, n-propyl, isopropyl, isobutyl, pentyl, hexyl, octyl, cyclopentyl, cyclohexyl, phenyl and tolyl groups.

Also employable as the organoaluminum compound is a compound represented by the following formula:

$$R^5_n AlY_{3-n}$$

wherein $R^5$ is as defined above, Y is $—OR^6$, $—OSiR^7_3$, $—OAlR^8_2$, $—NR^9_2$, $—SiR^{10}_3$ or $—N(R^{11})AlR^{12}_2$, n is 1 to 2, $R^6$, $R^7$, $R^8$ and $R^{12}$ are each a methyl, ethyl, isopropyl, isobutyl, cyclohexyl, phenyl or trimethylsilyl group, $R^9$ is a hydrogen atom, a methyl, ethyl, isopropyl, phenyl or trimethylsilyl group, and $R^{10}$ and $R^{11}$ are each a methyl or ethyl group.

More specific examples of the soluble vanadium compound, the organoaluminum compound, the metallocene compound of a transition metal, the organoaluminum oxy-compound and the optionally used organoaluminum compound, all of which are used for forming the transition metal catalysts (i) and (ii) employable in the present invention, are described in Japanese Patent Laid-Open Publication No. 41364/1994 (paragraphs: 0100–0153) by the applicant of the present application, and the catalysts formed from the compounds described therein can be used for the reaction of the present invention.

In the present invention, using the catalyst (i) or (ii), the α-olefin of at least 2 carbon atoms (a) and the cycloolefin (b) represented by the formula (I) or (II) are copolymerized in a liquid phase, preferably in a hydrocarbon solvent, in the presence of the aromatic ring-containing vinyl hydrocarbon-conjugated diene copolymer or the product of hydrogenation thereof (A).

Examples of the hydrocarbon solvents include aliphatic hydrocarbons, such as pentane, hexane, heptane, octane, decane, dodecane and kerosine, and halogen derivatives of these; aliphatic hydrocarbons, such as cyclohexane, methylcyclopentane and methylcyclohexane, and halogen derivatives of these; aromatic hydrocarbons, such as benzene, toluene and xylene, and halogen derivatives of these, such as chlorobenzene. In the copolymerization reaction, the α-olefin or the cycloolefin per se may be used as the hydrocarbon solvent. The solvents may be used in combination.

In the present invention, the copolymerization is preferably carried out in the presence of the above-mentioned hydrocarbon solvent, and it is particularly preferably carried out in the presence of a mixed solvent, such as a mixed solvent of cyclohexane-hexane, cyclohexane-heptane, cyclohexane-pentane, toluene-hexane, toluene-heptane or toluene-pentane.

The copolymerization may be carried out by any of a batchwise process and a continuous process, but it is preferably carried out by a continuous process. The catalyst concentration in the copolymerization reaction is described below.

In the case of the catalyst (i), the soluble vanadium compound is fed to the polymerization system in an amount of usually 0.01 to 5 mmol, preferably 0.05 to 3 mmol, per 1 liter of the polymerization volume; and the organoaluminum compound is fed in such an amount that the ratio of the aluminum atom to the vanadium atom (Al/V) in the polymerization system is not less than 2, preferably 2 to 50, more preferably 3 to 20. It is desired that the concentration of the soluble vanadium compound fed to the polymerization system is not more than 10 times, preferably 1 to 7 times, more preferably 1 to 5 times, as much as that of the soluble vanadium compound present in the polymerization system.

The soluble vanadium compound and the organoaluminum compound are generally fed to the polymerization system after they are each diluted with a liquid monomer and/or the above-mentioned hydrocarbon solvent. In this case, it is desired that the soluble vanadium compound is diluted so as to have the aforesaid concentration, while the organoaluminum compound is diluted so as to have an optional concentration of not more than 50 times as much as that of the organoaluminum compound present in the polymerization system.

In the case of the catalyst (ii), the metallocene compound is used in the polymerization system in an amount of usually about 0.00005 to 1.0 mmol, preferably about 0.0001 to 0.3 mmol, per 1 liter of the polymerization volume; and the organoaluminum oxy-compound is used in such an amount that the amount of the aluminum atom in the organoaluminum oxy-compound becomes usually about 1 to 10,000 mol, preferably 10 to 5,000 mol, based on 1 mol of the transition metal atom in the metallocene compound.

The copolymerization reaction is carried out in the presence of the catalyst (i) or (ii) under such conditions that the reaction temperature is usually −50° to 200° C., preferably −30° to 150° C., more preferably −20° to 100° C., and the pressure is more than 0 kg/cm$^2$ and not more than 50 kg/cm$^2$, preferably more than 0 kg/cm$^2$ and not more than 20 kg/cm$^2$. The reaction time (average residence time in the continuous copolymerization process) varies depending on kinds of the monomers used, catalyst concentration, polymerization temperature, etc., but it is in the range of usually 5 minutes to 5 hours, preferably 10 minutes to 3 hours.

In the copolymerization, the α-olefin (a) and the cycloolefin (b) are fed to the polymerization system in a molar ratio (a)/(b) of 10/90 to 90/10, preferably 10/90 to 50/50.

A molecular weight regulator, e.g., hydrogen, may be used in the copolymerization.

The α-olefin of at least 2 carbon atoms (a) and the cycloolefin (b) represented by the formula (I) or (II) are copolymerized in the presence of the aromatic ring-containing vinyl hydrocarbon/conjugated diene copolymer or the product of hydrogenation thereof (A) as described above, whereby a solution containing a cycloolefin copolymer composition (C) is obtained. In the solution, the cycloolefin copolymer composition (C) is contained in a concentration of usually 10 to 500 g/liter, preferably 10 to 300 g/liter. The solution is treated by a conventional method to obtain a cycloolefin copolymer composition (C).

The cycloolefin copolymer composition (C) may be prepared by dissolving the already prepared component (A), e.g., elastomer pellets, in a hydrocarbon solvent and then copolymerizing the α-olefin (a) and the cycloolefin (b) in the resulting solution, or it may be prepared by first producing the component (A) and then copolymerizing the α-olefin (a) and the cycloolefin (b) in the polymerization solution of the component (A).

The cycloolefin copolymer composition according to the invention is variously molded by known methods. For example, the copolymer composition is subjected to extrusion molding, injection molding, blow molding or rotational molding by means of various molding machines such as single screw extruder, vented extruder, twin-screw extruder, conical twin-screw extruder, co-kneader, platificator, mixtruder, planetary screw extruder, gear extruder and screwless extruder.

To the cycloolefin copolymer composition (C) of the invention, rubber components in order to further improve the impact strength of the composition (C) or various additives such as heat stabilizer, weathering stabilizer, antistatic agent, slip agent, anti-blocking agent, anti-fogging agent, lubricant, dye, pigment, natural oil, synthetic oil and wax may be added in amounts not detrimental to the object of the present invention.

Examples of the stabilizers which may be optionally added include phenolic antioxidants, such as tetrakis[methylene-3(3,5-di-t-butyl-4-hydroxyphenyl)propionate]methane, β-(3,5-di-t-butyl-4-hydroxyphenyl)propionic acid alkyl ester and 2,2'-oxamidebis[ethyl-3(3,5-di-t-butyl-4-hydroxyphenyl)]propionate; fatty acid metallic salts, such as zinc stearate, calcium stearate and calcium 12-hydroxystearate; and fatty acid esters of polyhydric alcohols, such as glycerol monostearate, glycerol monolaurate, glycerol distearate, pentaerythritol monostearate, pentaerythritol distearate and pentaerythritol tristearate. The stabilizers may be used singly, but they may be used in combination. For example, a combination of tetrakis[methylene-3(3,5-di-t-butyl-4-hydroxyphenyl)propionate]methane and zinc sterate or glycerol monostearate is employable.

In the present invention, a combination of the phenolic antioxidant and the fatty acid ester of polyhydric alcohol is particularly preferably used, and in this case the fatty acid ester of polyhydric alcohol is preferably a polyhydric alcohol fatty acid ester in which the alcohol hydroxyl groups of the polyhydric (particularly trihydric or more) alcohol are partially esterified. Examples of such fatty acid esters of polyhydric alcohols include glycerol fatty acid esters, such as glycerol monostearate, glycerol monolaurate, glycerol monomyristate, glycerol monopalmitate, glycerol distearate and glycerol dilaurate; and pentaerythritol fatty acid esters, such as pentaerythritol monostearate, pentaerythritol monolaurate, pentaerythritol dilaurate, pentaerythritol distearate and pentaerythritol tristearate. The phenolic antioxidant is used in an amount of 0 to 10 parts by weight, preferably 0 to 5 parts by weight, more preferably 0 to 2 parts by weight, based on 100 parts by weight of the cycloolefin resin. The fatty acid ester of polyhydric alcohol is used in an amount of 0 to 10 parts by weight, preferably 0 to 5 parts by weight, based on 100 parts by weight of the cycloolefin resin.

EFFECT OF THE INVENTION

The cycloolefin copolymer composition (C) of the present invention comprises a cycloolefin random copolymer component obtained by random copolymerizing the α-olefin of at least 2 carbon atoms (a) and the cycloolefin (b) in the presence of the aromatic ring-containing vinyl hydrocarbon-conjugated diene copolymer or the product of hydrogenation thereof (A) containing polymerizable carbon-to-carbon double bonds. In the copolymer composition (C), the cycloolefin random copolymer component is chemically bonded to the component (A) at least in part. Additionally, the difference $\Delta n_D$ between the refractive index $n_D(A)$ of the component (A) and the refractive index $n_D(B)$ of a cycloolefin random copolymer component (B) obtained by copolymerizing the α-olefin (a) and the cycloolefin (b) in the absence of the component (A) is not more than 0.015. Therefore, the cycloolefin copolymer composition (C) exhibits particularly improved transparency and impact resistance.

EXAMPLE

The present invention will be further described with reference to the following examples, but it should be construed that the invention is in no way limited to those example.

Measurement of various properties and evaluation are carried out in accordance with the following methods.

(1) Intrinsic viscosity (η)

The intrinsic viscosity (η) was measured at 135° C. in a decalin solution (1 g/liter) by means of an Ubbellohde viscometer.

(2) Glass transition temperature (Tg)

The glass transition temperature (Tg) was measured in an atmosphere of nitrogen ($N_2$) at a heating rate of 10° C./min by means of DSC-220C manufactured by Seiko Denshi K.K.

(3) Refractive index

The refractive index was measured at 25° C. by means of an Abbe's refractometer (D-line, 589 nm).

(4) Iodine value

The iodine value was measured by an iodine monochloride method in accordance with JIS K3331.

(5) Preparation of specimen

The specimen was prepared using an injection molding machine IS50EPN manufactured by Toshiba Kikai K.K. and a prescribed mold for specimen under the following molding conditions. After molding, the specimen was allowed to stand for 48 hours at room temperature, followed by measurement.

Molding conditions:

Cylinder temperature: 260° C.

Mold temperature: 60° C.

Injection pressure primary/secondary: 1,000/800 (kg/cm$^2$)

(6) Haze

The haze was measured by means of a haze meter (sheet thickness: 2 mm).

(7) Izod impact strength

The Izod impact strength was measured in accordance with ASTM D256.

Size of specimen: 5/2×1/8×1/2' inch (notched)

Test temperature: 23° C.

Example 1

To a 100-ml glass container having been dried and purged with nitrogen were introduced 80 mg of iropropylidene(cyclopentadienyl)(indenyl)zirconium dichloride and 70 ml of a toluene solution of methylaluminoxane (MAO) (available from Witco Co., aluminum concentration: 1.50 mmol/l), and they were irradiated with ultrasonic wave for 15 minutes to completely dissolve the metallocene.

Ethylene-norbornene copolymerization in the presence of component (A) (rubber)

As an aromatic substance/containing vinylated hydrocarbon/conjugated diene copolymer (aromatic ring-containing vinyl hydrocarbon/conjugated diene copolymer), 200 g of partially hydrogenated SBS (styrene/butadiene-styrene block copolymer, styrene (St) content: 45% by weight, hydrogenation ratio: 56%, refractive index: 1.533, iodine value: 100.3) indicated by a in Table 1 was dissolved in 5 liters of cyclohexane. Then, the resulting solution was added to a methanol/acetone mixed solvent (7/1 by volume) in quantities of 4 times as much as the solution with vigorous stirring to precipitate a solid. The solid was recovered by filtration, then sufficiently washed with methanol and vacuum dried at 50° C. for 12 hours in a stream of nitrogen.

The solid was dissolved in dry cyclohexane to obtain 1.5 liters of a solution, followed by nitrogen bubbling for 1 hour. Then, 1.2 liters of the solution was introduced into a 5-liter stainless steel autoclave having been vacuum dried and purged with nitrogen.

At room temperature and in a stream of nitrogen, to the system were added 887 g of norbornene (abbreviated to NB hereinafter), 731 ml of cyclohexane and 24 ml of a cyclohexane solution of triisobutylaluminum (TIBA) (1 mmol/l) so that the concentration in the system became 8 mmol/l, followed by stirring for 5 minutes. Subsequently, ethylene was fed with stirring so that the pressure in the system became 6 kg/cm$^2$-G, and release of the pressure was repeated three times to leave the system in an ethylene atmosphere.

The internal temperature of the autoclave was kept at 70° C., and ethylene was fed so that the internal pressure became 6 kg/cm$^2$. After 10-minute stirring, to the system was added 50 ml of the previously prepared toluene solution of isopropylidene(cyclopentadienyl)(indenyl)zirconium dichloride and methylaluminoxane, to initiate copolymerization reaction of ethylene and NB. As for the catalyst concentration, the concentration of the isopropylidene (cyclopentadienyl)(indenyl)zirconium dichloride in the whole system was 0.05 mmol/l, and the concentration of the methylaluminoxane in the whole system was 25 mmol/l. During the polymerization, ethylene was continuously fed to the system to maintain the internal pressure at 6 kg/cm$^2$. After 60 minutes, isopropanol was added to terminate the polymerization reaction. After release of the pressure, the polymer solution was taken out and brought into contact with an aqueous solution of concentrated hydrochloric acid (water: 3 liters, concentrated hydrochloric acid: 15 ml) in a ratio of 1:1 (polymer solution:aqueous solution) with vigorous stirring by means of a homomixer, whereby the catalyst residue was transferred into the aqueous phase. After the catalyst mixture liquid was allowed to stand, the aqueous phase was separated and removed. Then, the remainder was washed twice with distilled water to purify the polymer solution phase.

The polymer solution thus purified was brought into contact with acetone in quantities of 3 times as much as the polymer solution with vigorous stirring to precipitate a solid (copolymer). The solid was recovered by filtration and sufficiently washed with acetone. Then, the solid was introduced into acetone so that the solid concentration became 40 g/liter, whereby the unreacted NB remaining in the polymer was extracted under the conditions of a temperature of 60° C. and an extraction time of 2 hours. After the extraction, the solid was recovered by filtration and dried at 130° C. and 350 mmHg for 12 hours in a stream of nitrogen.

The ethylene/norbornene copolymer composition thus obtained had an intrinsic viscosity ($\eta$) of 0.70 dl/g, a glass transition temperature Tg of 141° C. and a component (A) (rubber) content of 17.8% by weight. The iodine value of this composition was 19.2. The molded product had Izod impact strength of 8.0 kg.cm/cm and haze of 44%.

The results are set forth in Table 2.

Example 2

Polymerization was carried out in the same manner as in Example 1 except that a mixture of SBS and SEPS indicated by a and b, respectively, in Table 1 was used as the aromatic substance-containing vinylated hydrocarbon/conjugated diene copolymer to adjust the refractive index.

The results are set forth in Table 2.

Example 3

Polymerization was carried out in the same manner as in Example 2 except that a mixture of SBS and SEPS indicated by a and b, respectively, in Table 1, which had a different mixing ratio between SBS and SEPS, was used as the aromatic substance-containing vinylated hydrocarbon/conjugated diene copolymer to adjust the refractive index.

The results are set forth in Table 2.

Comparative Example 1

Synthesis was carried out in the same manner as in Example 1 except that the aromatic substance-containing vinylated hydrocarbon/conjugated diene copolymer was not fed and the catalyst concentrations were varied to those shown in table 2.

The results are set forth in Table 2.

Comparative Example 2

Polymerization was carried out in the same manner as in Example 1 except that a mixture of SEPS and SEPS indicated by b and c, respectively, in Table 1 was used as the aromatic substance-containing vinylated hydrocarbon/ conjugated diene copolymer to adjust the refractive index.

The results are set forth in Table 2.

Comparative Example 3

Polymerization was carried out in the same manner as in Example 1 except that partially hydrogenated SIS indicated by d in Table 1 was used as the aromatic substance-containing vinylated hydrocarbon/conjugated diene copolymer.

The results are set forth in Table 2.

Comparative Example 4

An ethylene-norbornene copolymer synthesized under the same conditions as in Comparative Example 1 was pelletized by means of a twin-screw extruder (BT-30 manufactured by Plastic Kogaku Kenkyusho) under the conditions of a cylinder maximum temperature of 260° C. and a residence time of 1 minute. The pellets were blended with partially hydrogenated SBS indicated by a in Table 1 using the above extruder.

The evaluation results of the injection molded product are set forth in Table 3.

Comparative Example 5

An ethylene-norbornene copolymer synthesized under the same conditions as in Comparative Example 1 was pelletized by means of a twin-screw extruder (BT-30 manufactured by Plastic Kogaku Kenkyusho) under the conditions of a cylinder maximum temperature of 260° C. and a residence time of 1 minute. The pellets were blended with partially hydrogenated SBS and SEPS indicated by a and b, respectively, in Table 1 using the above extruder.

The evaluation results of the injection molded product are set forth in Table 3.

TABLE 1

Properties of aromatic ring-containing vinyl hydrocarbon-conjugated diene copolymer or the product of hydrogenation thereof (A)

| | Kind | St content | Hydrogenation ratio | Refractive index | Iodine value |
|---|---|---|---|---|---|
| a | SBS | 45 wt. % | 56% | 1.533 | 100.3 |
| b | SEPS | 65 wt. % | — | 1.545 | 1.4 |
| c | SEPS | 50 wt. % | — | 1.529 | 1.1 |
| d | SIS | 20 wt. % | 80% | 1.502 | 0.9 |

TABLE 2

Synthesis of cyloolefin copolymer in the presence of component (A)

| | Rubber component (A) | | | | | |
|---|---|---|---|---|---|---|
| | Kind | Ratio | (g) | $n_D$ (A) | $N_D$ (B) | Δ $n_D$ |
| Ex. 1 | a | 100% | 160 | 1.537 | 1.533 | 0.004 |
| Ex. 2 | a + b | 58/42 | 160 | 1.537 | 1.540 | 0.003 |
| Ex. 3 | a + b | 42/58 | 160 | 1.537 | 1.538 | 0.001 |
| Comp. Ex. 1 | none | — | 0 | 1.537 | — | — |
| Comp. Ex. 2 | b + c | 50/50 | 160 | 1.537 | 1.537 | 0 |
| Comp. Ex. 3 | d | 100% | 160 | 1.537 | 1.502 | 0.035 |

| | Zr (mmol/l) | MAO (mmol/l) | TIBA (mmol/l) | Yield (g) | Amount of Component (A) (wt. %) |
|---|---|---|---|---|---|
| Ex. 1 | 0.050 | 25.0 | 8.0 | 898 | 17.8 |
| Ex. 2 | 0.050 | 25.0 | 8.0 | 780 | 20.5 |
| Ex. 3 | 0.050 | 25.0 | 8.0 | 740 | 21.6 |
| Comp. Ex. 1 | 0.014 | 7.0 | 4.0 | 180 | 0 |
| Comp. Ex. 2 | 0.050 | 25.0 | 8.0 | 795 | 20.1 |
| Comp. Ex. 3 | 0.050 | 25.0 | 8.0 | 783 | 20.4 |

TABLE 2-continued

Synthesis of cyloolefin copolymer in the presence of component (A)

|  | Tg (°C.) | (η) (dl/g) | Iodine value (g-iodine/ 100 g polymer) | Izod (kg · cm/cm) | Haze (%) |
|---|---|---|---|---|---|
| Ex. 1 | 141 | 0.70 | 19.2 | 8.0 | 44 |
| Ex. 2 | 135 | 0.57 | 10.1 | 7.4 | 18 |
| Ex. 3 | 137 | 0.57 | 8.1 | 11.0 | 24 |
| Comp. Ex. 1 | 143 | 0.57 | 0.7 | 1.9 | 2 |
| Comp. Ex. 2 | 143 | 0.60 | 0.8 | 2.5 | 11 |
| Comp. Ex. 3 | 143 | 0.71 | 0.8 | 2.4 | 92 |

Note: Copolymerization conditions
5-liter autoclave, scale of 3 liters, 70° C., 60 minutes, NB: 887 g/3 liters-cyclohexane, metallocene:isopropylidene (cyclopentadienyl) (indenyl) zirconium dichloride As is evident from the results of the examples and the comparative examples shown in Table 2, with respect to the properties of the cycloolefin copolymer composition (C) obtained by copolymerizing ethylene and norbornene in the presence of the component (A) (rubber) shown in Table 1, the Izod value is small and the impact resistance is poor, when the component (A) having an iodine value of not more than 2 is used. As is also evident from the results, the cycloolefin copolymer component (B) of Comparative Example 1 obtained by copolymerizing ethylene and norbornene in the absence of the component (A) is poor in the impact resistance, though the haze value is small and the transparency is high.

TABLE 3

Blend of component (A) with component (B)

| | Rubber component (A) | | $n_D$ | $n_D$ | | Amount of Component | Tg | (η) | Izod | Haze |
|---|---|---|---|---|---|---|---|---|---|---|
| | Kind | Ratio | (A) | (B) | $\Delta n_D$ | (A) (wt %) | (°C.) | (dl/g) | (kg · cm/cm) | (%) |
| Comp. Ex. 4 | a | 100% | 1.537 | 1.533 | 0.004 | 20.0 | 142 | 0.71 | 5.0 | 90 |
| Comp. Ex. 5 | a + b | 58/42 | 1.537 | 1.540 | 0.003 | 20.0 | 142 | 0.61 | 3.2 | 75 |

Note: The copolymer synthesized under the same conditions as in Example 1 was used as the component (A).

As is evident from the results of Comparative Examples 4 and 5, when the ethylene/norbornene copolymer, i.e., cycloolefin copolymer component (B), and the partially hydrogenated SBS, i.e., partially hydrogenated product component (A) of the aromatic ring-containing vinyl hydrocarbon/conjugated diene copolymer (aromatic substance-containing vinylated hydrocarbon-conjugated diene copolymer), are merely blended with each other, the Izod value is small and the impact resistance is poor. Further, the haze value is large and the transparency is poor.

What is claimed is:

1. A cycloolefin copolymer composition (C) obtained by:

copolymerizing (a) an α-olefin and (b) a cycloolefin represented by the following formula (I)

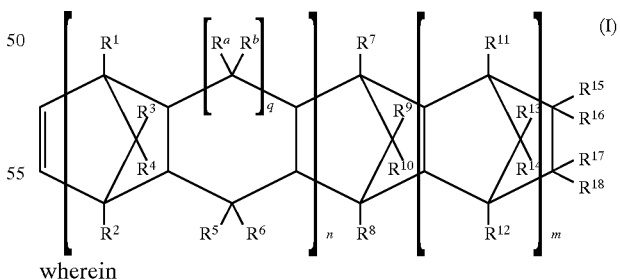

wherein
n is 0 or 1,
m is 0 or a positive integer,
r is 0 or 1,
each of $R^1$ to $R^{18}$, $R^a$ and $R^b$ independently represent a hydrogen atom, a halogen atom or a hydrocarbon group, provided that $R^{15}$ to $R^{18}$ may mutually bond to form a monocyclic or polycyclic ring structure which may contain a double bond, and a combination of $R^{15}$ and $R^{16}$ or a combination of $R^{17}$ and $R^{18}$ may form an alkylidene group, or by the following formula (II)

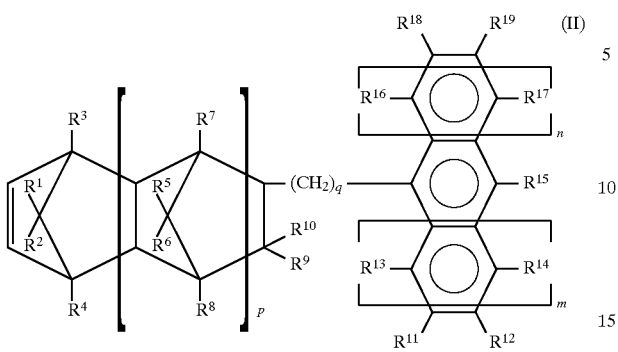

wherein
each of p and q is 0 or an integer of 1 or greater,
each of m and n is 0, 1 or 2,
each of $R^1$ to $R^{19}$ independently represents a hydrogen atom, a halogen atom, an aliphatic hydrocarbon group, an alicyclic hydrocarbon group, an aromatic hydrocarbon group or an alkoxy group, provided that a carbon atom with which $R^9$ or $R^{10}$ bonds and either a carbon atom with which $R^{13}$ bonds or a carbon atom with which $R^{11}$ bonds may bond with each other directly or through an alkylene group having 1 to 3 carbon atoms and that, when n=m=0, a combination of $R^{15}$ and $R^{12}$ or a combination of $R^{15}$ and $R^{19}$ may mutually bond to form an aromatic monocyclic ring or aromatic polycyclic rings, in the presence of component (A) a blend of a styrene/(ethylene/propylene)/styrene block copolymer and styrene/butadiene/styrene block copolymer, wherein the weight ratio of said styrene/(ethylene/propylene)/styrene block copolymer to styrene/butadiene/styrene block copolymer is 42/58 to 58/42, the component (A) having an intrinsic viscosity (η), as measured in decalin at 135° C., of 0.5 to 5.0 dl/g, at least one glass transition temperature (Tg), as measured by DSC, of lower than 15° C., polymerizable carbon-to-carbon double bonds in an amount of 2 to 150 (g-iodine/g-polymer) in terms of iodine value, and a refractive index $n_D(A)$, as measured at 25° C., of 1.50 to 1.65; wherein the copolymer composition (C) contains 1 to 40% by weight of the component (A), and a difference $\Delta n_D$ is not more than 0.015, where $\Delta n_D$ is $|n_D(A)-n_D(B)|$, $n_D(A)$ being the refractive index of component (A) and $n_D(B)$ being a refractive index of a cycloolefin copolymer component (B) obtained by copolymerizing said α-olefin (a) and said cycloolefin (b) in the absence of said component (A).

* * * * *